(12) United States Patent
Hayes

(10) Patent No.: US 7,326,766 B2
(45) Date of Patent: Feb. 5, 2008

(54) METHOD FOR PRODUCTION OF HIGH SOLIDS SILICONE RESIN COATING SOLUTION

(75) Inventor: Robert F. Hayes, Ballston Lake, NY (US)

(73) Assignee: Momentive Performance Materials Inc., Wilton, CT (US)

( * ) Notice: Subject to any disclaimer, the term of this patent is extended or adjusted under 35 U.S.C. 154(b) by 177 days.

(21) Appl. No.: 11/221,596

(22) Filed: Sep. 7, 2005

(65) Prior Publication Data

US 2007/0055046 A1 Mar. 8, 2007

(51) Int. Cl.
*C08F 6/00* (2006.01)

(52) U.S. Cl. ............. 528/480; 428/446; 428/447; 528/14; 528/21

(58) Field of Classification Search ............ 428/446, 428/447; 528/14, 21, 480
See application file for complete search history.

(56) References Cited

U.S. PATENT DOCUMENTS

| 3,976,497 | A |   | 8/1976  | Clark  |        |
|-----------|---|---|---------|--------|--------|
| 3,986,997 | A |   | 10/1976 | Clark  |        |
| 4,160,858 | A | * | 7/1979  | Roedel | 528/14 |
| 4,177,315 | A |   | 12/1979 | Ubersax |       |
| 4,277,287 | A |   | 7/1981  | Frye   |        |
| 4,368,235 | A |   | 1/1983  | Vaughn, Jr. |   |

* cited by examiner

*Primary Examiner*—Terressa Boykin
(74) *Attorney, Agent, or Firm*—Dominick G. Vicari

(57) ABSTRACT

An improved method for concentrating solids in silicone resin coating compositions is provided, said compositions comprising higher solids levels that are often needed in order to increase the thickness of the final coated film when applied to a given substrate.

28 Claims, No Drawings

METHOD FOR PRODUCTION OF HIGH SOLIDS SILICONE RESIN COATING SOLUTION

BACKGROUND OF THE INVENTION

1. Field of the Invention

The present invention relates to a method for the preparation of high solids silicone resin coating solutions. More specifically, the invention is a method for concentrating a silicone resin solution to provide a higher solids level for improved silicone resin performance.

2. Description of Related Art

Silicone resin coating compositions are presently being utilized to protect the surface of wood, metals, and synthetic polymers. These transparent coatings provide excellent mar and scratch resistance to acrylic and polycarbonate sheets used as glazing. An example of a widely used transparent polycarbonate glazing on which these coating are useful is Lexan® polycarbonate resin sold by General Electric Company.

The silicone resin coating formulations typically comprise an aqueous dispersion of colloidal silica or silica gel and silicone silsesquioxane resins formed from hydrolizable silanes, such as the trifunctional silanes of the formula, $R'Si(OR)_3$ and a solvent medium such as alcohol and water.

Degradation of silicone coating compositions, especially for weatherable coatings, from prolonged exposure to moisture, humidity and ultra violet light during outdoor use, has presented certain problems. Yellowing and hazing along with delamination of these protective coatings is often observed. Attempts to enhance the longevity of such silicone coatings have included modification of the solvent carrier, and modifications of the resin composition. These modifications include the introduction of additives to the coating as disclosed in U.S. Pat. No. 4,277,287 and altering the pH of the composition as disclosed in U.S. Pat. No. 4,368,235.

Control of coated film thickness is a key process parameter in application of coatings in order to achieve desired performance. Higher solids levels are often needed in order to increase the thickness of the final coated film when applied to a given substrate. The silicone resin compositions to which the claimed method can be applied can be found in U.S. Pat. No. 3,976,497, 3,986,997 and 4,177,315.

Traditional methods for increasing solids of a silicone resin solution require either, the adjustment of the reactant stoichiometry in order to minimize the formation of byproduct alcohols and residual water or, the application of heat and/or vacuum to "strip" off solvents and concentrate the resin. The former method (stoichiometry) results in a compromise in other performance attributes, such as, hardness of the cured coating and resistance to cracking, because the inputs into the silicone resin are changed to minimize the byproducts of the reaction. The later method, i.e. stripping, is practiced to manufacture select silicone hardcoat grades. In this method, the volatile solvents present in the initial resin hydrolyzate are stripped off to give an intermediate solution that is higher in resin content (>35%). Care must be exercised when utilizing this method as aggressive application of heat/vacuum or applications of heat/vacuum for long periods of time, i.e >24 hours, can result in significant degree of silanol functional group condensation. These functional groups are required to effect cure of the coating after it is applied to the substrate. Moreover, excessive condensation of silanol groups negatively impacts properties such as adhesion and hardness of the cured coating.

While the procedures mentioned above have provided acceptable coating formulations, there still remains room for improvement. For example, the method comprising this invention is a significant improvement over the currently practiced processes as it does not require the use of heat or vacuum to concentrate silicone resin solutions, and takes significantly less time to effect the increase in concentration of solids in the resins.

SUMMARY OF INVENTION

This invention provides a method for increasing the concentration of resin solids in silicone resin coating composition comprising the extraction of a solution of silicone resin containing an initial concentration of resin solids with an aqueous extractant. The solution of silicone resin and aqueous extractant are mixed vigorously and allowed to settle. Upon settling the solution provides an upper aqueous layer and a lower layer containing silicone resin solids. The concentration of solids in the lower layer being greater than the concentration of solids in the initial solution of silicone resin prior to extraction. The lower layer of resin is separated from the upper layer, which may be discarded. The resulting lower layer resin solution contains between about 40 and about 70 weight percent solids.

DEFINITIONS

"Silicone resins" as used herein are meant as highly cross-linked siloxane systems, and the cross-linking components are usually introduced as trifunctional or tetrafunctional silanes, but may also contain small amounts of difunctional and monofuctional silanes. The properties of the silicone resin depend upon the choice of silanes, the degree of cure, and on the processing conditions.

"Silicone resin solids" as used herein are the materials of the silicone resin coating compositions made from, silane, organic silanes, inorganic silane, polysiloxanes, polymerized organic silanol, partially polymerized organic silanol, organic siloxanol and the like, having a definite shape and volume. These resins also contain colloidia silica and could also contain other inorganic particles such as, aluminum oxide, titanium oxide, zinc oxide, cerium oxide, zirconium oxide, antimony oxide and/or other metal oxides.

An "aqueous extractant" as used herein is a solution in which water is the solvent. The aqueous extractant may include alcohols to suppress the effective removal of that particular alcohol within the solution of silicone resin and modify the residual solvent composition of the concentrated resin phase. Acids may be added to the aqueous extractant to neutralize basic coating solutions and shift pH into the 4.0-6.5 range to yield stable high solids products

DETAILED DESCRIPTION OF THE INVENTION

In accordance with the present invention, there is provided a method to produce increased concentrations of solids in silicone resin coating compositions by extracting a solution of silicone resin containing an initial concentration of about 5 to about 45 weight percent solids with an aqueous extractant. The method comprises combining the aqueous extractant with the solution of silicone resin and vigorously agitating them to provide an upper aqueous layer and a lower layer containing silicone resin and particulate solids upon settling. Upon separation of the liquid layers, the lower layer has a concentration of about 40 to about 70 weight percent resin solids.

The silica of the solution of silicone resin can be obtained, for example, by the hydrolysis of tetraethyl orthosilicate to form polysilicic acid. The hydrolysis can be carried out using conventional procedures, for example, by the addition of an aliphatic alcohol and an acid. The organic silanol used to produce the polysilsesquioxane used in the instant composition has the general formula $RSi(OH)_3$. For optimum performance of the coating compositions, at least about 60 weight percent of the R groups, and preferably about from 80 weight percent to 100 weight percent of these groups, are methyl. Alternatively, up to about 40 weight percent of the R groups can be higher alkyl or aryl selected from vinyl, phenyl, 3,3,3-trifluoropropyl, α-glycidoxypropyl, and α-methacryloxypropyl.

The combined solids of the initial solution of silicone resin coating composition, comprising the silica and the partially polymerized organic silanol, generally make up about from 15 to about 45 weight percent of the total initial compositions. Of these solids, the silica should comprise about from 0 to 50 weight percent, and preferably about from 20 to 30 weight percent, the complimentary remainder comprising the organic siloxanol.

The solvent component of the initial coating compositions generally comprises a mixture of water and one or more lower aliphatic alcohols. The lower aliphatic alcohols comprises from about 40 to 90 weight percent of the coating composition. Suitable alcohols include, but are not limited to, aliphatic alcohols generally those having from 1 to 4 carbon atoms, such as methanol, ethanol, n-propanol, isopropanol, n-butanol, sec-butanol, methoxypropanol and tertiary butanol, and mixture thereof. In one embodiment of the present invention, the alcohols of the initial coating compositions include methanol, iso-propanol, and n-butanol.

Water generally comprises from about 10 to 30 weight percent of the solvent mixture. The upper limit on the water is a function of the initial resin concentration, as resin concentration decreases more water can be tolerated in the initial coating composition prior to a phase separation.

The solvents may also include acids, such as carboxylic acid comprising from about 0 to about 10 weight percent of the total solvent weight. These are carboxylic acids having 1-3 carbon atoms. Carboxylic acids of the initial coating compositions include, but are not limited to, formic acid, acetic acid, and propanoic acid, and mixture thereof. In one aspect of the present invention, the carboxylic acid of the initial coating compositions is acetic acid.

In addition to the basic solvent components of alcohol and water, the solvent portion of the instant compositions can further comprise up to about 10 weight percent of a compatible polar protic (hydrogen bonding) solvent. Addition of polar aprotic solvents (non-hydrogen bonding) results in precipitation of the silica containing fraction of the resin (when present as part of the mixture).

Suitable polar protic solvents include, but are not limited to, glycols such as ethylene glycol, propylene glycol, and butylene glycol, monoethers of glycols such as ethylene glycol monoethylether, ethylene glycol monobutylether, diethylene glycol monoethylether, and methoxypropanol, and mixtures thereof. In one embodiment of the present invention, the polar protic solvent of the present invention is methoxypropanol.

Still further components that can be present in the instant coating compositions include curing catalysts. These are preferably present in a concentration of about from 0.01 to 0.1 weight percent based on the total weight of the composition, and especially about from 0.01 to 0.3 weight percent of the total weight of the composition. Curing catalysts which may be used in the coating compositions can vary widely. Representative catalysts include the alkali metal salts of carboxylic acids such as sodium acetate, potassium acetate, sodium formate, and potassium formate. Other representative curing catalysts which can be used include the quaternary ammonium carboxylates, such as benzyltrimethylammonium acetate. Still other components of the initial solution of silicone resin may include UV absorbers, such as, silylated dibenzyl resorcinol or silylated hydroxybenzophenone and the like.

An important feature of the present compositions is that the initial silicone resin coating composition has an acidic pH. The pH of the initial silicone resin coating composition should be greater than about 4.0 and less than about 8.0. In one embodiment of the present invention, the initial silicone resin coating composition of the present invention has a pH of least 4.0 to about 7.0. In another embodiment of the present invention, the pH of the initial silicone resin coating composition is from about 4.0 to about 6.5.

The pH of the coating solution can be adjusted according to techniques well known to those skilled in the art, including the addition of an acidic or basic solution. Suitable acids for the adjustment of pH of the coating solution include, but are not limited to, hydrochloric, phosphoric, and carboxylic acids, and mixture thereof. In one embodiment of the present invention acetic acid is employed for the adjustment of the pH of the initial silicone resin coating composition. Suitable bases for the adjustment of pH of the coating solution include, but are not limed to, ammonium hydroxide, ammonium acetate, and tetraalkyl ammonium hydroxides and mixture thereof. In another embodiment of the present invention ammonium hydroxide is employed for the adjustment of the pH of the initial silicone resin composition.

It has been found that within this pH range, 4.0 to 6.5, the aqueous extractant, upon liquid-liquid phase separation preferentially extracts the more polar solvents (e.g. methanol, ethanol, acetic acid and methoxypropanol) and forms the upper aqueous layer, or "lighter" layer. In this phase separation the silicone resin and the solvents of lesser polarity in the solvent mixture (e.g. n-butanol and iso-propanol) form the lower layer, or "heavy" phase. The lower layer, the concentrated resin solution, is stable with respect to further condensation, and will remain as a solution for several weeks at room temperature. Early attempts to study the effect of water on siloxane resin solutions concluded that water would cause an irreversible formation of gel of the concentrated resin solution after standing for several days. These early resin solutions had a pH of greater than 7.

The inventive method to generate high concentrations of solids in silicone resin solutions uses among others resin grades AS4010, AS4700, and AS4000 (after acidification) sold by General Electric Company. However, most resins having an acid pH and those that can be acidified may be used to generate high concentrations of solids in silicone resin solutions.

The silicone resin solutions of the present invention generally are mixed with between 0.25 to 2 parts aqueous extractant (e.g. water) by weight. In one embodiment of the present invention, the silicone resin solutions of the present invention are mixed with 0.8 to 1.2 parts aqueous extractant by weight. In another embodiment of the present invention, the silicone resin solutions of the present invention are mixed with about equal parts by weight of the aqueous extractant, i.e. approximately a 1:1 ratio of aqueous extractant to silicone resin solution. The initial silicone resin solutions typically start with between about 10 and about 45 weight percent solids, and preferably, between 20 and 25 percent weight solids.

The aqueous extractant of the present invention is a solution in which water is the main solvent. Generally water comprises from about 80 to about 100 weight percent of the aqueous extractant. In one embodiment of the present invention the aqueous extractant of the present invention comprises 100 weight percent water. In another embodiment, the aqueous extractant of the present invention will include one or more water soluble solvents. Specific examples of suitable water soluble solvents include, but are not limited to, alcohols, glycols, glycol mono-ethers of glycols, and acids.

Suitable alcohols, as water soluble solvents of the aqueous extractant, include, but are not limited to lower aliphatic alcohols generally those having from 3 to 6 carbon atoms, for example, n-propanol, iso-propanol, n-butanol, sec-butanol, iso-butanol, tert-butanol, 2-methyl-2-butanol, 3-pentanol, 3-hexanol and mixture thereof. In one embodiment of the present invention, the alcohols of the aqueous extractant are n-butanol, sec-butanol, and 2-methyl-2-butanol. In another embodiment of the present invention, the alcohols of the aqueous extractant are n-butanol and sec-butanol. However, suitable long chain alcohols as water soluble solvents of the aqueous extractant are contemplated herein.

Suitable mono ethers, as water soluble solvents of the aqueous extractant, include, but are not limited to ethylene glycol monoethylether, ethylene glycol monobutylether and diethylene glycol monoethylether, methoxypropanol, and mixtures thereof. In one embodiment of the present invention, the mono-ethers of the aqueous extractant are ethylene glycol monobutylether, methoxypropanol. In another embodiment of the present invention, the mono-ether of the aqueous extractant is methoxypropanol.

Further, acids may be added to the aqueous extractant to neutralize basic coating solutions and shift pH into the 4.0-6.5 range to yield stable high solids products. Suitable acids that can be added to the aqueous extract for adjustment of pH include, but are not limited to, hydrochloric, phosphoric, and carboxylic acids, and mixture thereof. In one aspect of the present invention, the aqueous extractant of the present invention uses acetic acid for the adjustment of pH to yield stable high solids products.

In one embodiment of the present invention, the aqueous extractant includes water soluble solvent(s) in an amount of about 0 weight percent to about 20 weight percent. In yet another embodiment of the present invention, the aqueous extractant includes water soluble solvent(s) from about 0 weight percent to about 10 weight percent, and an acid such as acetic acid in an amount of about 0 weight percent to about 10 weight percent. In still another embodiment of the present invention, the aqueous extractant includes acetic acid from about 0 weight percent to about 5 weight percent.

The silicone resin solution and aqueous extractant are mixed, the mixture is then agitated vigorously for approximately 2 to 10 minutes and poured into a separatory funnel or other device that allows for separation of the phases. The mixture is allowed to settle for 20 to 60 minutes, until two liquid layers are distinctly visible. The lower "heavy" layer comprising the resin solution is drawn off, and the upper "lighter" aqueous layer may be discarded. The resulting resin solution of the lower layer contains between 40 and 70 weight percent solids. Typically the resulting resin solution contains approximately 59 weight percent solids. As such, the method of concentrating the solids in silicone resin solution is performed in minimal time.

The resulting concentration of solids in the resin solution of the lower layer is a function of the initial concentration of solvents in the resin solution and the ratio of the initial resin solution to aqueous extract added (e.g. water). Initial solvent compositions and resulting solids percentages in the concentrated resin phase are shown in Table 1.

The solvents in the resulting lower layer resin solution are depleted of the more polar alcohols and carboxylic acids (e.g. methanol, ethanol, methoxypropanol and acetic acid, respectively) relative to the initial resin solutions. The resulting concentration of the solvents in the resin solution of the lower layer is a function of the initial resin solution to aqueous extractant ratio. The resulting concentrations of solids of the various ratios of the initial resin solution to aqueous extractant are described in Table 2.

The silicone resin coating compositions concentrated by the method disclosed herein, have sample shelf stability similar to those of the initial solids level as shown by the change in silanol group concentration over time. This is most conveniently measured by determining the $T^3:T^2$ ratio of the resin sample by $Si^{29}$ NMR and monitoring its change over time. Data of representative samples are shown in Table 4.

In one embodiment of the present invention, the initial silicone resin coating compositions must have a $T^3:T^2$ of greater than about 0.5. In another embodiment of the present invention, the initial silicone resin coating compositions to which the process can be successfully applied must have a $T^3:T^2$ ratio of about 0.52 to about 1.70. Addition of aqueous extractant (e.g. water) to resin solutions with $T^3:T^2$ ratio of less than about 0.5 results in the formation of a mixture that will not separate into two distinct phases, hence, a concentrated resin phase cannot be isolated as illustrated by the data in Table 5.

The present coating compositions can be used for a wide variety of coating applications where a durable, abrasion-resistant surface is desired. The present compositions have been found to be particularly satisfactory in the coating of films, sheeting materials, and injection molded articles made from polycarbonate, methylmethacrylate polymers and copolymers, and polyethylene terephthalate. Similar compositions are also found satisfactory in coatings of metal substrates for the purpose of anti-corrosion.

Initial resin solution solvent composition and the resulting concentrated resin phase solids concentration after mixing and separating with a 1:1 (weight ratio) mixture of resin solution and aqueous extractant (water). Characterization of the physical nature of the concentrated resin phase was made on the basis of the flow of the material under it's own weight. The viscosity of the material increased according to the following: viscous liquid<very viscous liquid<semisolid<stiff semisolid<very stiff semisolid.

TABLE 1

| | Initial Resin Solution | | | | | | Concentrated Resin Solution | | |
|---|---|---|---|---|---|---|---|---|---|
| Sample | Solids | Water | Methanol | iso-propanol | n-butanol | 1-methoxy-2-propanol | Acetic Acid | Resin Conc. Solids | Yield | Characterization |
| a | 39.8% | 17.0% | 36.4% | | | | 6.9% | 59.2% | 67% | Very stiff semisolid |
| b | 39.1% | 17.6% | 36.4% | | | | 6.9% | 61.6% | 70% | Very stiff semisolid |
| c | 31.1% | 12.8% | 28.2% | 11.3% | 11.3% | | 5.3% | 60.5% | 55% | Stiff semisolid |
| d | 31.3% | 12.7% | 28.2% | | 22.5% | | 5.3% | 56.8% | 51% | viscous liquid |
| e | 30.8% | 13.1% | 28.2% | 22.5% | | | 5.3% | 62.9% | 53% | very viscous liquid |
| f | 31.0% | 12.9% | 28.2% | | | 22.5% | 5.3% | 63.6% | 52% | Stiff semisolid |

TABLE 1-continued

| | Initial Resin Solution | | | | | | Concentrated Resin Solution | | |
|---|---|---|---|---|---|---|---|---|---|
| Sample | Solids | Water | Methanol | iso-propanol | n-butanol | 1-methoxy-2-propanol | Acetic Acid | Resin Conc. Solids | Yield Characterization |
| g | 25.7% | 9.2% | 21.0% | 16.7% | 16.7% | 5.9% | 4.0% | 57.7% | 42% viscous liquid |
| h | 30.6% | 11.2% | 25.3% | | | 27.3% | 4.8% | 65.1% | 48% semisolid |

Weight percentage concentration of resin solution solids as a function of initial resin solution: aqueous extractant (water) ratio.

TABLE 2

| Resin Solution:Water Ratio | Resulting Solution Solids |
|---|---|
| 0.00 | 25.8% |
| 0.34 | 40.0% |
| 0.50 | 59.5% |
| 0.67 | 56.3% |
| 0.91 | 58.9% |
| 0.99 | 56.8% |
| 1.00 | 59.2% |
| 1.50 | 59.6% |
| 1.98 | 66.6% |

Solvent concentrations as a function of initial resin solution: aqueous extractant (water) ratio.

TABLE 3

| Resin Solution:Water Ratio | Water | Methanol | Ethanol | iso-propanol | Acetic Acid | n-butanol | 1-methoxy-2-propanol |
|---|---|---|---|---|---|---|---|
| 0.00 | 9.88% | 21.48% | 0.71% | 15.99% | 6.07% | 15.99% | 4.07% |
| 0.50 | 13.22% | 6.46% | 0.28% | 8.12% | 1.17% | 9.77% | 1.96% |
| 0.67 | 12.35% | 6.54% | 0.28% | 9.00% | 1.19% | 12.03% | 1.99% |
| 0.91 | 12.15% | 5.20% | 0.25% | 8.33% | 1.03% | 13.08% | 1.75% |
| 0.99 | 11.55% | 5.03% | 0.25% | 8.42% | 1.00% | 13.74% | 1.72% |
| 1.00 | 11.19% | 4.72% | 0.24% | 8.22% | 0.96% | 13.60% | 1.65% |
| 1.50 | 11.69% | 3.71% | 0.19% | 7.00% | 0.75% | 14.12% | 1.32% |
| 1.98 | 9.92% | 2.94% | 0.15% | 5.57% | 0.54% | 13.01% | 1.01% |

$T^3:T^2$ ratio (proportional to silanol concentration) of typical low solids resin solutions and the high solids resin solutions prepared from them by the disclosed process. $T^2$ is the di-condensed trifunctional silane, $T^3$ is the tri-condensed, tri-functional silane in the resin composition.

TABLE 4

| Sample | Initial $T^3:T^2$ | Days at 22° C. | Final $T^3:T^2$ | Aging Rate ($T^3:T^2$/day) |
|---|---|---|---|---|
| AS4000 (intial resin solution) | 1.70 | 12 | 2.08 | $3.2 \times 10^{-2}$ |
| 56.7% solids resin from AS4000 | 1.70 | 12 | 1.97 | $2.3 \times 10^{-2}$ |
| AS4010 (intial resin solution) | 0.98 | 31 | 1.25 | $8.7 \times 10^{-3}$ |
| 59.1% solids resin from AS4010 | 0.98 | 31 | 1.20 | $7.1 \times 10^{-3}$ |

Successful extraction and phase separation as a function of $T^3:T^2$ ratio. The AS4000 (Acidified), AS4010, and AS4700 samples shown in table were extracted with a 1:1 weight ratio of water to resin solution.

TABLE 5

| Sample | Initial $T^3:T^2$ | Initial Solids | Final Solids | Comment |
|---|---|---|---|---|
| AS4000 (Acidified) | 1.70 | 20.0% | 58.0% | Viscous Resin Solution Isolated |
| a (Example 2) | 1.30 | 39.1% | 59.2% | Stiff Semi Solid Isolated |
| b (Example 2) | 1.18 | 39.8% | 61.6% | Stiff Semi Solid Isolated |
| AS4010 | 0.98 | 25.2% | 59.2% | Viscous Resin Solution Isolated |
| AS4700 | 0.52 | 25.3% | 51.5% | Viscous Resin Solution Isolated |
| a' (Example 2) | 0.43 | 39.5% | — | Emulsion formed, no phase separation |
| a" (Example 2) | 0.37 | 24.0% | — | Suspended gel formed, no phase separation |

The following examples herein below are provided to enable one skilled in the art to practice the invention and are merely illustrative of the invention. The example should not be read as limiting the scope of the invention as defined in the claims.

EXAMPLE 1

A 12 L jacketed glass reactor was fitted with an overhead stirrer (4 bladed agitator). The kettle was then charged with 6 L of 25 weight percent solids silicone resin solution (AS4010). The agitator was started and 6 L of deionized water was added to the reactor. Agitation was continued for 5 minutes during this time the mixture appeared as a milky suspension. Agitation was then stopped and the mixture was allowed to settle for 60 minutes. The resin phase (lower phase) was taken off to yield 1.9 L of an amber coloured solution. The material was found to be 57.1 weight percent solids. The isolation process took 75 minutes from the time of initial charge to completion of the decantation of the resin phase.

EXAMPLE 2

A 2L erlenmeyer flask was charged with 448.6 g of methyltrimethoxy silane and 10.9 g of acetic acid. A total of 360.1 g of a 30.8% (as $SiO_2$) solution of colloidial silica in water was then added to the silane/acetic acid over 20 minutes while agitating the mixture. The reaction mixture was allowed to stir for 14 hours then 48.9 g of acetic acid was added. A portion of the reaction mixture (sample a') was then immediately mixed with 1 part water in an attempt to extract the silicone resin, however, no distinct phase separation occurred. A second sample (sample a") comprised of 1 part by weight reaction mixture, 0.05 part by weight acetic acid, 0.29 part by weight iso-propanol, and 0.29 part by weight n-butanol was immediately prepared. Sample a" was then mixed with 1 part water in an attempt to extract the silicone resin, however, no distinct phase separation occurred. The $T^3:T^2$ of these resin solutions was measured at 0.43 and 0.37 respectively (results are summarized in Table 5). The silicone resin solution was then allowed to stand for 2 weeks to "age" prior to use in water extraction experiments (a & b in Table 6, $T^3:T^2$ of these resin solutions was measured at 1.30 and 1.18 respectively). Portions of this solution were then used to formulate resin solutions with different solids concentrations and starting solvent compositions (c-h in Table 6). In addition, silylated dibenzyl resorcinol (SDBR) containing samples (g & h) were also formulated for testing from this parent resin solution. The SDBR containing formulations were allowed to stand for a minimum of 16 hours in order to allow the SDBR to incorporate into the resin structure before any extractions were attempted. The formulations a-h listed in Table 1 were then mixed with 1 part water (aqueous extractant) for 1 part final resin solution. The mixtures were shaken for 2 minutes then allowed to settle for 30 minutes. Formulations a-c, f, and h formed semisolids and were easily separated by simple decantation. Formulations d, e, and g formed viscous liquid solutions and were separated from the aqueous phase using a separatory funnel. The results from the extractions of the specific resin solutions are shown in Table 1.

The weight parts of each specific formulation (a-h) prepared from the base solution described in Example 2 are listed below. Results of water extraction of these resin solutions are shown in Table 1.

TABLE 6

| Solution | Stock Resin Solution | iso-propanol | n-butanol | 1-methoxy-2-propanol | SDBR |
|---|---|---|---|---|---|
| A | 1.000 | | | | |
| B | 1.000 | | | | |
| C | 1.000 | 0.362 | 0.362 | | |
| D | 1.000 | | 0.719 | | |
| E | 1.000 | 0.731 | | | |
| F | 1.000 | | | 0.726 | |
| G | 1.000 | 0.651 | 0.651 | 0.231 | 0.048 |
| H | 1.000 | | | 0.891 | 0.048 |

COMPARATIVE EXAMPLE 1

A comparative sample was prepared by the traditional "stripping" process: A 1L jacketed glass reactor was charged with 1122 g of 20 weight percent silicone resin solution (AS4700). The pressure inside the vessel was reduced to 100 mm Hg and the solution heated to 50° C. for 120 minutes to distil volatile solvent out of the solution. The solution was then cooled to room temperature and removed from the reactor to yield 880 g of 33 weight percent solids silicone resin solution. The total time for the stripping process was 130 minutes from the time of initial charge to removal of the stripped resin phase.

COMPARATIVE EXAMPLE 2

The 1 L jacketed glass reactor was again charged with 1038 g of 20 weight percent solids silicone resin solution. The pressure inside the vessel was reduced to 100 mm Hg and the solution heated to 50° C. for 195 minutes to distil volatile solvent out of the solution. The solution was then cooled to room temperature and removed from the reactor to yield 634 g of 42 weight percent solids silicone resin solution. The total time for the stripping process was 205 minutes from the time of initial charge to removal of the stripped resin phase.

Obviously, other modifications and variations of the present invention are possible in light of the above teachings. It is, therefore, to be understood that changes may be made in the particular embodiments described above which run within the full intended scope of the invention as defined in the appended claims.

What is claimed is:

1. A method for increasing the concentration of solids in silicone resin coating composition comprising:
   (a) extracting a solution of silicone resin containing an initial concentration of resin solids with an aqueous extractant to provide an upper aqueous layer and a lower layer containing silicone resin solids, the concentration of solids in the lower layer being greater than the initial concentration of the solution of silicone resin prior to extraction; and
   (b) separating the lower layer from the upper layer,
wherein the concentration of solids is obtained in the substantial absence of added heat and/or vacuum.

2. The method of claim 1, wherein the aqueous extractant comprises water, and optionally at least one water soluble solvent.

3. The method of claim 2, wherein the water soluble solvent is selected from the group consisting of aliphatic alcohols having from about 1 to about 6 carbon atoms, glycol mono-ethers, acids, and mixtures thereof.

4. The method of claim 2, wherein the water soluble solvent is selected from the group consisting of aliphatic alcohols having from about 3 to about 6 carbon atoms.

5. The method of claim 4, wherein the aliphatic alcohol is selected from the group consisting of methanol, ethanol, n-propanol, iso-propanol, n-butanol, sec-butanol, and tertiary butanol, and mixture thereof.

6. The method of claim 5, wherein the alcohol is selected from the group consisting of iso-propanol, n-butanol, iso-butanol, and 2-methyl-2-butanol and mixture thereof.

7. The method of claim 3, wherein the mono-ether is selected from the group consisting of ethylene glycol monoethylether, ethylene glycol monobutylether, diethylene glycol monoethylether, methoxypropanol, and mixtures thereof.

8. The method of claim 3, wherein the acid is selected from the group consisting of hydrochloric, phosphoric, carboxylic acids, sulfonic acids, and mixture thereof.

9. The method of claim 8, wherein the acid is acetic acid.

10. The method of claim 2, wherein the aqueous extractant comprises from about 80 to about 100 weight percent water.

11. The method of claim 10, wherein the aqueous extractant comprises 100 weight percent water.

12. The method of claim 2, wherein the aqueous extractant comprises from about 0 to about 20 weight percent water soluble solvent.

13. The method of claim 12, wherein the aqueous extractant comprises from about 0 to about 10 weight percent water soluble solvent.

14. The method of claim 2, wherein the aqueous extractant comprises from about 0 to about 5 weight percent acid.

15. The method of claim 1, wherein the weight ratio of aqueous extractant is from about 0.34 parts to about 1.98 parts to each part of the solution of silicone resin.

16. The method of claim 1, wherein the ratio of aqueous extractant to solution of silicone resin is about 1 to 1.

17. The method of claim 1 wherein the solution of silicone resin has a pH in the range of from about 3.5 to about 7.0.

18. The method of claim 1, wherein the solution of silicone resin has a pH in the range of from about 4.5 to about 6.5.

19. The method of claim 1, wherein the solution of silicone resin has a pH of about 4.5.

20. The method of claim 1, wherein the aqueous extractant has a pH in the range of from about 3.5 to about 7.0.

21. The method of claim 1, wherein the aqueous extractant has a pH in the range of from about 4.5 to about 6.5.

22. The method of claim 1, wherein the aqueous extractant has a pH of about 4.5.

23. The method of claim 1, wherein the lower layer containing silicone resin comprises from about 40 to about 70 weight percent solids.

24. The method of claim 1, wherein the lower layer containing silicone resin comprises about 60 weight percent solids.

25. The method of claim 1, wherein the silicone resin coating composition of the lower layer has a shelf life of at least 4 weeks at ambient temperatures.

26. The method of claim 1, wherein the initial solution of silicone resin prior to extraction has a $T^3:T^2$ ratio greater than about 0.5.

27. The method of claim 26, wherein the initial solution resin prior to extraction has a $T^3:T^2$ ratio of about 0.52 to about 1.70.

28. The method of claim 1, wherein the lower layer containing silicone resin is diluted with a polar organic solvent prior to application to a substrate.

* * * * *